United States Patent [19]
Pethis

[11] 3,709,572
[45] Jan. 9, 1973

[54] REVERSIBLE SHIELD-SEAL FOR A BEARING

[75] Inventor: James J. Pethis, Farmington, Conn.

[73] Assignee: Textron Inc., Providence, R.I.

[22] Filed: Dec. 16, 1970

[21] Appl. No.: 98,616

[52] U.S. Cl. ............................308/187.2, 277/32, 277/94
[51] Int. Cl. ............................F16c 33/78, F16c 33/80
[58] Field of Search ....308/187.1, 187.2; 277/32, 53, 277/94, 95

[56] References Cited

UNITED STATES PATENTS

| | | | |
|---|---|---|---|
| 2,887,330 | 5/1959 | Cobb | 277/32 |
| 3,114,559 | 12/1963 | Miglietti et al. | 308/187.2 |
| 2,734,757 | 2/1956 | Martin | 308/187.2 |
| 2,764,433 | 9/1956 | Cobb | 308/187.1 |
| 2,723,869 | 11/1955 | Cobb | 277/94 |
| 3,114,560 | 12/1963 | Dunn | 308/187.2 |
| 3,423,141 | 1/1969 | Pethis | 308/187.2 |

FOREIGN PATENTS OR APPLICATIONS

| | | | |
|---|---|---|---|
| 1,281,749 | 12/1961 | France | 308/187.2 |

Primary Examiner—Edgar W. Geoghegan
Assistant Examiner—Barry Grossman
Attorney—Sandoe, Hopgood & Calimafde

[57] ABSTRACT

The invention contemplates a single annular disc element with elastomeric formations so sized and proportioned that, when installed in a suitable retaining groove of one of the rings of an antifriction bearing or the like, the disc element will close the gap between bearing rings and will provide selective availability of a seal function or of a shield function, depending upon the axial orientation of the disc element in its assembly to the retaining groove. Specifically, in cooperation with a tapering surface of the other bearing ring (i.e. the ring which rotates with respect to the grooved ring), the disc element will position an elastomeric seal lip in light resiliently deflected interference with the tapered surface, for one assembled orientation; on the other hand, for the axially-reversed assembled orientation, the disc element positions the seal lip in close-clearance relation with the tapered surface, to provide a shield function. Various further features are also provided.

10 Claims, 9 Drawing Figures

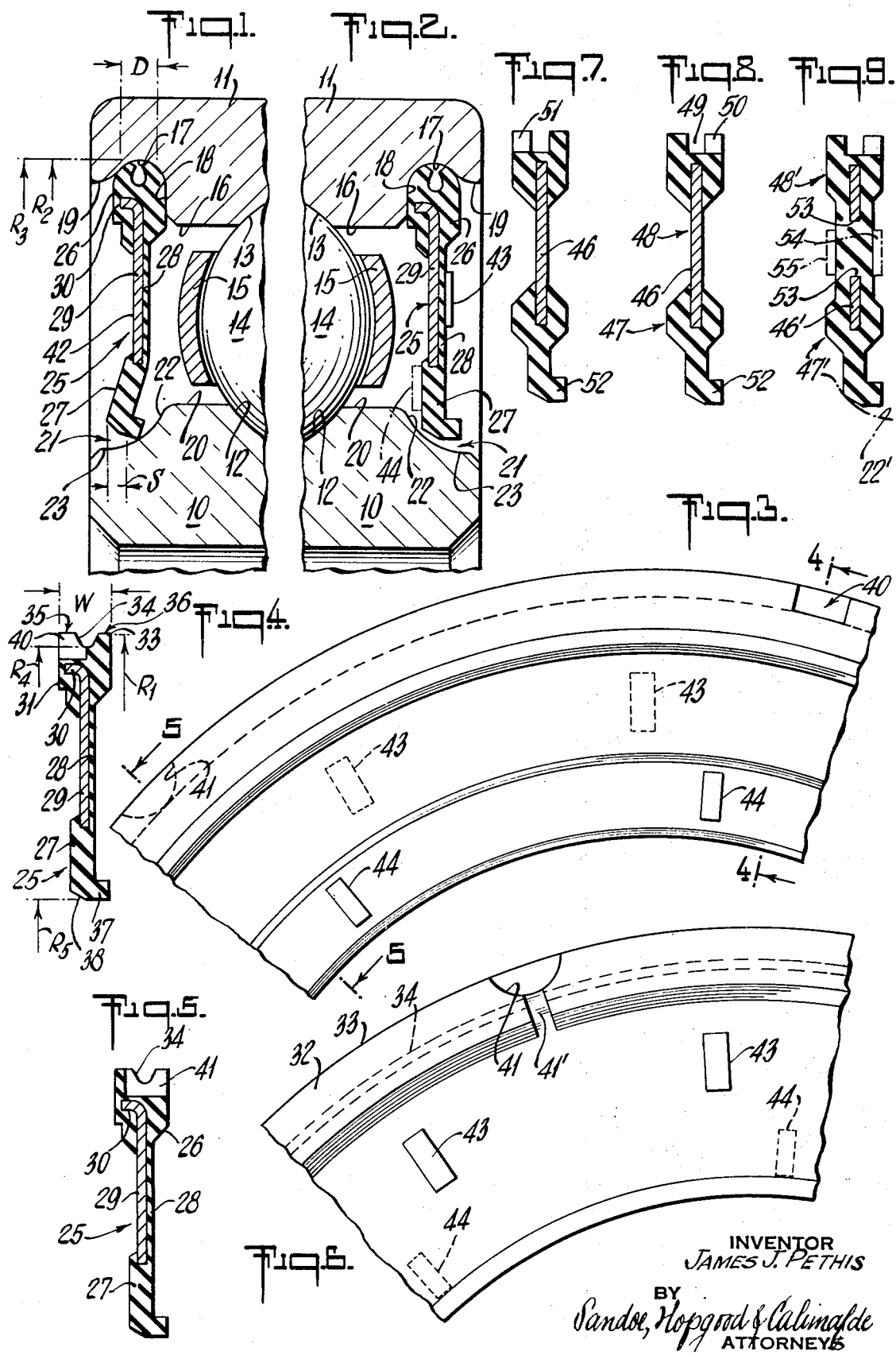

REVERSIBLE SHIELD-SEAL FOR A BEARING

This invention relates to annular-disc closures for the end or ends of antifriction bearings or the like. Such closures are known as seals when they make contact with both rings of the bearing; they are known as shields when they do not make such contact but merely provide close clearance between the ends of the bearing rings.

In the past, shields for bearings of the character indicated have been of metal, having staked or swaged metal-to-metal contact with the bearing ring relied upon for support. Necessarily, the metal of the shield is deformed; thus, to remove an installed shield may entail its destruction.

Also many bearing types are basically applicable to installation requirements where a seal is mandatory or where a shield is mandatory, but it has in the past been necessary to make special provision in the contour of the opposed surfaces of the bearing rings, in order that they may receive their specified seal element (in one case) or their specified shield element (in another case). Thus, the seal and shield elements for a particular bearing size or type have been different, and the bearing-ring contouring, grooving and the like have also been different, depending upon the specified shield or seal function for the bearing.

It is a specific object of the invention to provide a single disc-element structure which can provide selective availability of shield and seal functions in a given bearing of the character indicated.

Another object is to provide such a structure with a controlled venting function.

A further object is to provide means in such a structure whereby non-damaging access can be had to the same for removal from its installed position, regardless of the shield or seal function in which it was installed.

A specific object is to provide a bearing and a single disc-element structure for closure of an axial end of the bearing and wherein said structure is axially reversibly installed in the same part of the bearing to provide a seal function for one orientation and a shield function for the reversed orientation.

A still further object is to provide indicia means whereby the installed function of the structure of the invention will be readily apparent, without requiring close inspection.

Other objects and various further features of the invention will be pointed out or will occur to those skilled in the art from a reading of the following specification in conjunction with the accompanying drawings. In said drawings, which show, for illustrative purposes only, preferred forms of the invention:

FIG. 1 is an enlarged fragmentary vertical sectional view of a bearing with an end closure of the invention, installed to provide a seal function;

FIG. 2 is a view similar to FIG. 1, to illustrate the same closure device when installed in a reversed orientation to provide a shield function;

FIG. 3 is a fragmentary view in elevation of one side of the closure element of FIGS. 1 and 2, as seen from outside the end of FIG. 1;

FIGS. 4 and 5 are sectional views taken at 4—4 and 5—5, respectively, of FIG. 3;

FIG. 6 is a view similar to FIG. 3, as seen from outside the end of FIG. 2;

FIGS. 7 and 8 are like sectional views of a modified closure, the respective sections being taken at angularly spaced locations; and FIG. 9 is a view similar to FIG. 8 to show a further modification.

Referring to the embodiment of FIGS. 1 to 6, and in particular to FIG. 1, the invention is shown in application to a ball bearing comprising inner and outer rings 10–11 with opposed grooved raceways 12–13, and with a plurality of balls 14 riding the raceways 12–13 and radially and axially positioning the rings 10–11 for relative rotation. Retainer means 15 maintains the desired spacing of balls 14.

Between its raceway 13 and its axial ends, the bore of the outer ring 11 is characterized by shoulder or land means 16, the end of which is recessed or cut away to establish an element-retaining groove 17. Groove 17 faces radially inwardly and is shown with a radial abutment or shoulder face 18 at its inner end and with a substantially less pronounced radially inward bead or lip 19 at its outer end.

In similar fashion, the outer surface of the inner ring 10 is characterized by shoulder or land means 20, between the raceway 12 and the axial ends of the ring 10. And in the region of coaxial overlap with the groove 17, the inner ring 10 is recessed or cut away to establish a generally conically tapering surface 21. Surface 21 is preferably concave, as shown, and has a gently changing slope between an outer radial zone 22 and an inner radial zone 23. In the outer zone 22, the slope of surface 21 is characterized by radial and axial components of substantially the same proportions, but at the inner zone 23, the radial component of the slope is relatively small, so that surface 21 extends substantially axially at the axial end of ring 10.

The closure element 25 of the invention is a reversible annular shield-seal disc having an elastomeric radially outer annulus portion 26 and an elastomeric radially inner annulus portion 27. As shown, a single piece of elastomeric material defines both inner and outer portions 26–27 and an integral connecting wall portion 28, which is essentially a thin covering of one side face of an annular plate 29 of reinforcing material, such as a washer of stamped sheet metal; plate 29 may include an axial flange 30, preferably at the region of adjacency to the seating region, such as the annular portion 26 which is received in the groove 17. The flange 30 is shown fully embedded in the outer annular portion 26, with the flat radial body of plate 29 located substantially at the axially central plane of the portion 26, between axial ends thereof.

In the unassembled and, therefore, unstressed condition of closure 25, the outside radius $R_1$ (FIG. 4) of the outer annular portion 26 is intermediate the groove-entrance radius $R_2$ (FIG. 1) and the groove bottom radius $R_3$, all as measured about the bearing axis (not shown). This unstressed outside radius $R_1$ intercepts opposed converging walls of groove 17 at a spacing D (FIG. 1) which is preferably in the range of 50 to 80 percent of the unstressed axial width W (FIG. 4) of the outer annular portion 26. The outer peripheral contour of portion 26 may be of generally square section between flat side walls 31–32 and contiguous to an outer cylindrical wall 33, at relatively sharp outer edges, as best shown in FIGS. 4 and 5; the central region of wall 33 is cut by a radially outwardly open circumferential groove 34, thereby establishing an axially yieldable property in spaced rims or feet 35–36. In FIG. 4, the side-wall surfaces of groove 34 are seen to diverge outwardly, and the bottom radius $R_4$ of groove 34 (in the unstressed condition) is preferably less than, and at least no greater than, substantially the groove-entrance radius $R_2$. When assembled over the groove entrance of lip 19, the outer annular portion 26 is axially compressed due to the interference D–W, resulting in partial but not complete constriction of the groove 34; at the same time, the inwardly oriented one (32) of the side walls 31–32 receives firm axially locating support at shoulder 18.

When the closure 25 is performing a seal function (as in FIG. 1), the flange 30 is preferably axially outwardly oriented, thus providing stiffly reinforced radial backing which favors the leg or rim 35, to assure a firm predominance of axially directed resilient loading of sidewall 32 against the locating shoulder 18 of groove 17. Such resilient loading not only assures accurate axial positioning for the seal function, but also provides a residuum of axial backing force, to sustain such axially directed seal-reaction force as results from the wiping contact relied upon for seal action, as will become more clear.

The inner annular elastomeric portion 27 is best seen in FIGS. 4 and 5, in the unstressed condition. It is essentially a flat radial annulus, at the radially outer portion of which the bore of plate 29 is embedded, leaving the remainder of portion 27 to project radially inwardly and to have inherent resilient axial yieldability. The unstressed bore radius $R_5$ (FIG. 4) of portion 27 is preferably intermediate the outer and inner zones 22–23 of the inner ring surface 21, and an axial lip 37 projects axially inwardly when the closure 25 is performing its sealing function. The extent of projection of lip 37 is such as to produce interference with surface 21 in the course of assembly to groove 17, the displacement S in FIG. 1 being indicative of the magnitude of lip displacement after encountering such interference. It will be understood that by suitably proportioning lip 37 in terms of the stiffness of the elastomeric material and in terms of other dimensions and proportions, the magnitude of wiping-contact pressure or preload can be selected and closely held.

In order that the same closure 25 may reversibly perform a shield function, as depicted in FIG. 2 (for the case of another end-seating groove 17), the bore of lip 37 may be suitably contoured, as by a chamfer 38 at the outside corner or heel of the juncture of lip 37 to the primary radial body of annular portion 27. The magnitude of relief at chamfer 38 determines shield clearance with respect to surface 21, and the primarily axial nature of the bore of lip 37 and of the adjacent inner zone 23 of ring 10 assure a relatively axially extensive definition of the shield clearance.

In accordance with a feature of the invention, the peripheral groove 34 provides a labyrinthian character to a system for venting the bearing, particularly when sealed (as in FIG. 1). And the venting is achieved while also facilitating installation and removal of the closure 25. As shown, a first plurality of spaced channels 40 is radially outwardly open and axially communicates between groove 34 and one (to the exclusion of the other) of the side walls 31–32 (FIG. 4); in similar fashion, a second plurality of spaced channels 41 is radially outwardly open and axially communicates between groove 34 and the other (to the exclusion of the one) of the side walls 31–32 (FIG. 5). Both sets of channels 40–41 have substantial overlap with flange 30; the channels 40 are preferably three, equally spaced, and equally interlaced with a corresponding plurality of channels 41. As shown, the externally exposed channels 40, for the case of seal-function assembly, are characterized by generally rectangular configuration (see FIG. 3); and the externally exposed channels 41, for the case of shield-function assembly, are characterized by generally arcuate contour (FIG. 6), thus providing a basis for visual recognition of the assembled function. As shown, a limited radial channel 41' (FIG. 6) communicates along the axially inner face of annulus 26, to channel 41, to assure venting of the sealed condition.

The described closure is illustrative of further means for visually recognizing the selected (assembled) function of closure 25. As previously noted, the elastomeric material continuously covers plate 29 on one side (28); in contrast, a substantial and circumferentially continuous surface 42 of plate 29 is exposed. Thus, exposed solid elastomeric color (e.g., black) will designate a shielded bearing end, while an exposed metallic annulus 42 will designate a sealed bearing end.

Still further externally exposed indicia may be provided, as in the course of molding elastomeric material to the plate 29. Thus, as seen in FIGS. 2, 3 and 6, a first set of lugs or other formations 43 exposed on one side and at a first intermediate-radius zone may be externally indicative of the shield function, while the particular plurality of such lugs 43 may be recognized to designate, for example, a particular shield-clearance property. And a second set of lugs or other formations 44 exposed on the other side and at a second intermediate-radius zone may be externally indicative of the seal function, while the particular plurality of such lugs 44 may be recognized to designate, for example, a particular seal-preload property.

In any case, for the indicated pluralities of channels 40–41, a single three-jaw tool may have precise entry into one or the other of channel sets 40–41, for uniform radially inward compressional grip on closure 25, against the stiff backing reaction of plate 29, to enable disassembly, safely past the groove entrance 19. In this process, no damage to or permanent deformation of closure 25 occurs, and all elastomeric elements and features resume their unstressed shapes (FIGS. 4 and 5).

In the modification of FIGS. 7 and 8, the reinforcement plate member 46 is a flat, radial-plane annulus, and bonded, as by a single molding process, to separate inner and outer elastomeric annular portions 47–48. A single radially outwardly open peripheral groove 49 in the seating annulus 48 defines the seating rims or feet already described. This groove 49 communicates with first spaced vent channels 50 open to one axial end, at locations interlaced with second spaced vent channels 51 open to the other axial end. All channels 50–51 overlap the adjacent outer rim or edge of plate 46. The lip 52 at the inner annular portion 47 is formed and performs as described at 37 for the first embodiment.

In the embodiment of FIG. 9, a single reinforcing plate 46' is provided with plural angularly spaced apertures 53, and a single piece of elastomeric material integrally unites the inner and outer annular portions 47'–48', covering both sides of plate 46' and filing the apertures 53. The phantom contours 54–55 suggest integral molding of appropriate different indicia, for ready external recognition of assembled function.

It will be seen that the invention achieves all the stated objects with basically simple structure which lends itself to foolproof assembly and function-recognition. Cost savings are realized through the multiple-function capabilities of the structure and through its non-destruct assembly and disassembly feature. The limited vent via a labyrinthian route assures pressure equalization of a sealed bearing, with minimum (if any) externally exuded lubricant, and with maximum protection against entry of external contaminants (including sprayed liquids). Symmetry of grip is achieved to remove the closure from the groove 17, regardless of whether the shield or the seal function has been selected. For example, the phantom indication of bare (i.e., light pressure) contact of the seal of FIG. 9 with the inner-ring surface at 22' will be understood to suggest that the seal of FIG. 9 may be reversibly employed (a) in a normally deflected relation (as depicted in FIG. 1) and (b) in a barely-contacting, and therefore only slightly deflected and axially loaded relation (FIG. 9). This, of course, calls for a proper dimensioning of the cooperating parts, and the result is to provide, with the same parts, an option of reversibly assembling the seal with normal drag (FIG. 1 relation) or with unusually light drag (FIG. 9 relation).

While the invention has been described in detail for the preferred forms shown, it will be understood that modifications may be made without departure from the invention. Specifically, it is to be understood that use of the expression "reversible shield-seal element" herein is not necessarily limiting to shield and seal functions; rather, this expression serves, for want of better language, to express the concept of achieving two different modes of cooperation between the reversible element and the bearing ring with respect to which it is to rotate. Such functions may be (a) a shield and a seal function, (b) two differently loaded seal functions, or (c) two different shield functions, depending on the bearing-ring profiles and groove locations that may be involved, in the use of any particular reversible element (25 in FIG. 1, FIG. 7 or FIG. 9).

I claim:

1. A reversible shield-seal element for a bearing or the like ring having a radially inward retaining groove, said element comprising an annular disc having an elastomeric radially outer annulus portion and an elastomeric radially inner annulus portion, said outer annulus portion being of axial extent to seat within and axially stabilize in the ring groove, said inner annulus portion having at its bore an axially directed circumferentially continuous seal lip projecting axially on predominantly one to the exclusion of the other side of the central axial plane of said outer annulus portion, whereby the shield function or the seal function of said element may be selectively available by selecting the axial direction of orientation of said lip upon seating assembly of said element to the bearing-ring groove, said radially outer annulus portion having a radially outwardly directed circumferential groove between axial ends, said outer annulus portion having a first axially directed vent channel at one angular location and communicating between the groove and one of said axial ends, and said outer annulus portion having a second axially directed vent channel at another angular location and communicating between the groove and the other of said axial ends.

2. A shield-seal element according to claim 1, in which said first vent channel is one of a first plurality of angularly spaced channels to said one axial end, in which said second vent channel is one of a second plurality of angularly spaced channels to said other axial end, and in which the channels of said pluralities are at different angular locations.

3. A shield-seal element according to claim 2, in which said pluralities are the same, in which the angular spacings are equal and in which said pluralities are uniformly interlaced.

4. A shield-seal element according to claim 3, in which each of said pluralities is three.

5. A reversible shield-seal element for a bearing or the like ring having a radially inward retaining groove, said element comprising an annular disc having an elastomeric radially outer annulus portion and an elastomeric radially inner annulus portion, said outer annulus portion being of axial extent to seat within and axially stabilize in the ring groove, said inner annulus portion having at its bore an axially directed circumferentially continuous seal lip projecting axially on predominantly one to the exclusion of the other side of the central axial plane of said outer annulus portion, whereby the shield function or the seal function of said element may be selectively available by selecting the axial direction of orientation of said lip upon seating assembly of said element to the bearing-ring groove, said disc including a relatively stiff annular plate member interconnecting said radially inner and outer annular portions at an axial location intermediate the axial ends of said outer annular portion, said outer annular portion having a plurality of axially directed and radially outwardly facing channels at angularly spaced locations, said channels being open to one to the exclusion of the other of said axial ends and extending axially into overlap with at least part of said plate member, whereby said channels provide tool access for removal of an installed member when said channels are installed for outward exposure, said outer annular portion having a second plurality of axially directed and radially outwardly facing channels at angularly spaced locations spaced from those of said first plurality, whereby tool-access is available to remove an installed element regardless of its installed function, and yet the channels of one plurality do not directly communicate with those of the other plurality, and said outer annular portion having a circumferentially continuous radially outwardly directed groove between axial ends and communicating between said channels, whereby a labyrinthian-passage venting function is additionally available for the installed element.

6. A shield-seal element according to claim 5, in which said plate member is substantially continuously embedded in elastomeric material.

7. A shield-seal element according to claim 6, in which said plate member has plural apertures at angularly spaced locations, said elastomeric material filling said apertures.

8. A shield-seal element according to claim 6, in which said plate member is fully embedded in said elastomeric material, except for an axially exposed annular area of one face of said plate member in a limited radial region between said inner and outer annular portions.

9. A shield-seal element according to claim 8, in which said plate member is fully covered by said elastomeric material on that axial side which faces in the projecting direction of said lip.

10. A reversible shield-seal element for a bearing or the like ring having a radially inward retaining groove, said element comprising an annular disc having an elastomeric radially outer annulus portion and an elastomeric radially inner annulus portion, said outer annulus portion being of axial extent to seat within and axially stabilize in the ring groove, said inner annulus portion having at its bore an axially directed circumferentially continuous seal lip projecting axially on predominantly one to the exclusion of the other side of the central axial plane of said outer annulus portion, whereby the shield function or the seal function of said element may be selectively available by selecting the axial direction of orientation of said lip upon seating assembly of said element to the bearing-ring groove, said disc including a relatively stiff annular plate member bonded to and radially between said radially inner and outer annulus portions at an axial location intermediate the axial ends of said outer annulus portion, said outer annulus portion having a plurality of axially directed and radially outwardly facing channels at angularly spaced locations, a first plurality of said channels being open to one to the exclusion of the other of said axial ends, a second like plurality of said channels being open to said other to the exclusion of said one axial end, the channels of said pluralities being in angularly interlaced and spaced distribution about said disc, and all said channels being at least in part radially outside said plate member and extending axially into overlap with at least part of said plate member, whereby tool-access is available to remove an installed element regardless of its installed function.

* * * * *